May 26, 1936. E. A. NELSON 2,041,776
BRAKE DRUM
Filed May 10, 1934

INVENTOR.
EMIL A. NELSON
BY
ATTORNEY.

Patented May 26, 1936

2,041,776

UNITED STATES PATENT OFFICE 2,041,776

BRAKE DRUM

Emil A. Nelson, Lansing, Mich., assignor to Motor Wheel Corporation, a corporation of Michigan Application May 10, 1934, Serial No. 724,871

6 Claims. (Cl. 188—218)

This invention relates to brake drums of the type particularly applicable for use in connection with motor vehicles, the principal object being the provision of a brake drum that is simple in construction, economical to manufacture and efficient in use.

Objects of the invention include the provision of a brake drum of composite nature including a stamped sheet metal supporting portion and a cast metal liner, the supporting portion being so formed as to provide means for materially enhancing the rigidity thereof as well as to provide an increased area of heat radiating surfaces to more efficiently transfer heat from the liner to the air surrounding the drum structure; the provision of a brake drum structure including a sheet metal ring portion having a liner of cast metal intimately associated therewith, the ring member being formed to provide a plurality of outwardly extending and relatively closely associated projecting portions serving to increase the heat radiating surface of the drum and so constructed and arranged as to agitate the air coming in contact therewith to further increase the transfer of heat between the drum and the air surrounding it; the provision of a brake drum structure including a sheet metal ring portion of substantially uniform thickness having a plurality of relatively closely associated protuberances on the outer surface thereof pressed out from the metal of the drum and thereby enhancing the rigidity of the ring portion as well as to increase the heat radiating surfaces thereof, and a liner of cast material intimately associated with the sheet metal ring and mechanically interlocked therewith through the depressions or cavities formed interiorly of the ring by the provision of the aforementioned projections exteriorly thereof.

The above being among the objects of the present invention, the same consists in certain novel features of construction and combinations of parts to be hereinafter described with reference to the accompanying drawing, and then claimed, having the above and other objects in view.

Figure 2:
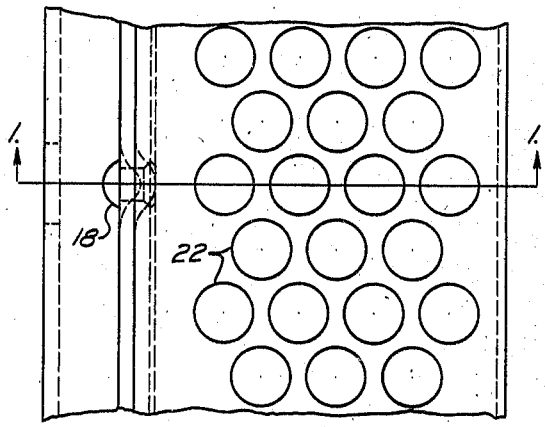
Figure 1:
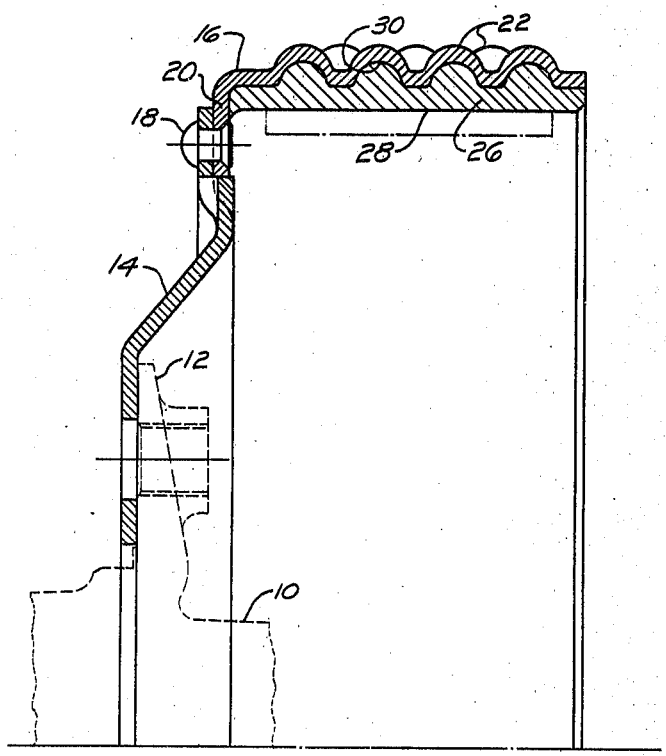

In the accompanying drawing which illustrates suitable embodiments of the present invention and in which like numerals refer to like parts throughout the several different views, Fig. 1 is a fragmentary sectional view taken axially through a brake drum on the line 1—1 of Fig. 2.

Fig. 2 is a fragmentary plan view of the brake drum illustrated in Fig. 1.

The use of ribs or other cooling fins on the exterior of a brake drum in order to enhance the cooling of the drum by providing an increased area of heat radiating surface for contact with the surrounding air is well known in the art. As far as I am aware, however, the brake drums in these prior constructions were of completely cast formation and the ribs or fins were formed either during the casting operation or formed thereafter by machining away a portion of the metal from the outer surface of the drum.

Brake drums of the above described construction have, however, been found too expensive for use in connection with quantity production of motor vehicles and for this reason the use of such drums has been materially restricted. The industry, however, has recognized the advantage of cast metal surfaces as braking surfaces and in an attempt to realize the advantage of a cast metal braking surface without being subjected to the expense of casting the entire drum, there has been introduced on the market in recent years a brake drum structure in which the main body portion has been formed of sheet metal and the rim of which is internally provided with a liner of cast material usually intimately associated therewith as by being fused thereto. This type of brake drum has been found very satisfactory, but with a modern tendency toward smaller wheels in motor vehicles and consequent necessity of employing brake drums of smaller diameter it has been found that the temperature of the brake drum in practice has been caused to increase to a point where it endangers the life and proper functioning of the friction material for the braking elements, as well as adversely affecting the wear of the drum itself.

In accordance with the present invention, the above described composite brake drum structure may be provided with cooling elements in the form of projections or other protuberances upon its outer face to increase the area of heat radiating surfaces thereof so as to obtain the advantages of the construction first explained, and this without materially increasing the cost of producing such composite brake drum structures. In accomplishing this result I find at the same time that the method herein employed materially adds to the rigidity of the sheet metal portion of the drum and this to such an extent that it is possible to reduce the thickness thereof as compared to that in structures heretofore employed, thus enabling an economy to be realized in the cost of manufacture as well as to provide a more efficient brake drum. This is accomplished by pressing or otherwise deforming the sheet metal ring to produce radially outwardly projecting proturberances or projections upon the exterior surface thereof and which thus act to increase the heat radiating area of the drum surface and thereby enhance the transfer of heat therefrom to the surrounding air. At the same time in thus forming or deforming the sheet metal ring portion to produce such protuberances or projections the cross-sectional configuration of the sheet metal ring is so altered as to materially increase its section modulus and therefore its resistance to bending and/or other strains. The depressions or cavities formed on the interior surface of the sheet metal ring are of course filled by the metal of the cast liner and thus affords a means whereby the protuberances or projections are not only internally reinforced but the liner is mechanically interlocked to the sheet metal ring.

Referring now to the drawing, a wheel hub is shown in dotted lines and indicated at 10, the hub 10 being provided with a radially outwardly directed flange 12 to which the brake drum is adapted to be suitably secured. Although in the broader aspects of the invention the sheet metal disc or web portion 14 of the brake drum may be formed either integrally with or separately from the rim or ring portion 16 thereof, as a matter of illustration these two parts are shown in the drawing as being separately formed and thereafter secured together by means of a plurality of rivets 18. For the purpose of effecting the connection between the parts 14 and 16, the part 16 is provided at its inner end with a radially inwardly directed flange 20 which abuts and is suitably centered upon the outer edge portion of the web or disc 14 in a manner forming no part of the present invention, the rivets 18 co-acting between the flange 20 and the periphery of the web or disc 14 to effect the above described union between the parts.

In Figs. 1 and 2, as illustrative of one embodiment of the present invention, a sheet metal ring 16 which is formed of metal of uniform gauge is pressed, rolled or otherwise suitably acted upon between its opposite ends to deform a portion of the metal thereof outwardly with respect to the main body portion thereof to provide a plurality of closely associated radially outwardly projecting semi-spherically shaped knobs or bosses 22. These bosses 22 may be disposed around the periphery of the ring member 16 in any desired relation but as shown they are disposed in rows parallel to the axis of the ring 16 with the knobs or bosses 22 in one row in axially offset or staggered relation with respect to the knobs or bosses in the next adjacent rows. These knobs or bosses 22 being drawn from the metal of the ring 16 itself act to increase the heat radiating surfaces of the ring 16 without the requirement of additional metal therein. Furthermore, it will be apparent that during rotation of the brake drum the knobs or bosses 22 will act to agitate the air coming in contact therewith and in the particular staggered arrangement indicated in Figs. 1 and 2 will enhance the flow of air over the drum.

It will readily be understood by those skilled in the art that in pressing the metal of the ring member 16 outwardly beyond the normal plane thereof, the section modulus of the ring member 16 will be so varied as to materially increase the same and as a result the strength and rigidity of the member 16 is materially increased. For this reason it is possible with the construction described to form the ring member 16 from lighter gauge metal than has heretofore been possible in order to obtain the requisite strength and rigidity thereof.

The ring member 16 is provided internally thereof with a liner 26 providing a cylindrical braking surface 28. The liner 26 is preferably formed from cast iron and introduced into the ring member 16 while the latter is rotating by pouring molten cast iron into the member 16 so that under the influence of the centrifugal action of the rotating ring it will be evenly distributed over the interior surfaces thereof. Preferably, the ring member 16 is brought to a suitable temperature immediately prior to the operation of casting the liner 26 therein so that a fusion will occur between the liner 26 and the ring member 16 to thereby provide a suitable bond to facilitate the heat transfer between these members as well as to secure them together in fixed relation. However, in the present case the liner 26 will be securely locked in place whether such fusion occurs or not due to the fact that a portion of the metal of the liner 26 will fill each of the depressions or cavities 30 formed on the inner side of the ring member 16 as a result of the operation in forming the exterior projections 22. As a result of this fact it will be apparent that the liner 26 will be mechanically interlocked with the ring 16 and in such a manner as to positively prevent any disengagement between these parts.

It is desirable when using projections or bosses as shown in this embodiment, in order to obtain the added strength and cooling area of the ring member 16, that there be at least six of the bosses 22 for each inch of diameter of the drum.

It will be obvious to those skilled in the art that the knobs or bosses and/or projections on the ring member 16 specifically shown and described in the accompanying drawing are open to a wide variety of changes in shape, size, contour and arrangement and, accordingly, it will be understood that formal changes may be made in the specific embodiment of the invention described without departing from the spirit or substance of the broad invention, the scope of which is commensurate with the appended claims.

What I claim is:

1. A brake drum structure comprising, in combination, an outer sheet metal ring of uniform gauge and a cast metal liner therefor, projections on the outer face of said ring arranged in relatively closely associated relation about the periphery thereof, said projections being arranged in plural relation both axially and circumferentially of said ring, the interior surface of said ring being provided with a depression corresponding to each of said projections, said cast metal liner covering the inner face of said ring and filling said depressions.

2. A brake drum structure including a sheet metal outer ring and a cast metal liner therefor, said ring having a substantially equal wall thickness throughout, radially outwardly extending dome-like projections on the outer face of said ring arranged in closely associated relationship throughout the periphery of said ring said projections being arranged in plural relation both axially and circumferentially of said ring, the inner face of said ring being provided with a plurality of depressions therein corresponding to said projections on the outer face thereof, and said cast metal liner covering the inner face of said ring and filling said depressions thereby to mechanically interlock it with said ring.

3. A brake drum structure including a sheet metal outer ring of uniform gauge and a cast metal liner therefor, said ring having a substantially equal wall thickness throughout, a plurality of radially outwardly extending dome-like projections on the outer face of said ring arranged in closely associated relationship throughout the periphery of said ring, said projections being generally spaced from one another both axially and circumferentially of said ring, the inner face of said ring being provided with a plurality of depressions therein corresponding to said projections on the outer face thereof, said liner covering the inner face of said ring and filling said depressions and being fused to the opposed face of said ring.

4. A brake drum structure including, in combination, an outer sheet metal ring, a plurality of outwardly extending projections on the outer face of said ring, said projections being arranged in rows parallel to the axis of said ring and axially offset from one another circumferentially of said ring, the inner face of said ring having depressions therein corresponding to said projections, and a cast metal liner intimately associated with the inner face of said ring and filling said depressions.

5. A brake drum structure comprising, in combination, a sheet metal outer ring, a plurality of substantially semi-spherical projections on the outer face of said ring arranged in closely associated relation about the periphery of said ring and substantially covering said periphery, said projections being staggered relative to one another circumferentially of said ring, the inner face of said ring being provided with a plurality of depressions therein corresponding to said projections on the outer face thereof, and a cast metal liner intimately associated with the inner face of said ring and filling said depressions.

6. A brake drum comprising, in combination, a sheet metal outer ring portion the surface of which is provided with outwardly extending dome-like projections embossed thereon, said projections being arranged in plural relation both axially and circumferentially of said ring portion, substantially completely covering the radially outer surface of said ring portion and being provided in such numbers that there are at least six of said projections for each inch of diameter of said drum, the inner surface of said ring being provided with a plurality of cavities corresponding in location to said projections, and a cast metal liner within said ring providing a braking surface on its interior face and filling said depressions and thereby reinforcing said projections.

EMIL A. NELSON.